(12) United States Patent
Rundquist et al.

(10) Patent No.: US 8,787,157 B2
(45) Date of Patent: Jul. 22, 2014

(54) MULTI-STREAMING MULTI-HOMING DELAY TOLERANT NETWORK PROTOCOL

(75) Inventors: Ronald Rundquist, Glendale, AZ (US); Pablo Bandera, Avondale, AZ (US); Yunjung Yi, Glendale, AZ (US); Haowei Bai, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 13/167,111

(22) Filed: Jun. 23, 2011

(65) Prior Publication Data

US 2012/0327847 A1 Dec. 27, 2012

(51) Int. Cl.
*H04L 12/56* (2006.01)
*H04J 3/16* (2006.01)

(52) U.S. Cl.
CPC ............... *H04L 47/10* (2013.01); *H04L 49/90* (2013.01); *H04J 3/1682* (2013.01)
USPC ............ 370/229; 370/316; 370/230; 709/226

(58) Field of Classification Search
CPC .... H04B 7/18508; H04L 49/90; H04L 47/10; H04J 3/1682
USPC ................. 370/316, 412, 468, 232, 229, 230; 709/226, 238
See application file for complete search history.

(56) References Cited

U.S. PATENT DOCUMENTS

| | | | | |
|---|---|---|---|---|
| 6,947,445 | B1 * | 9/2005 | Barnhart | 370/468 |
| 2009/0080451 | A1 * | 3/2009 | Gogic | 370/412 |
| 2009/0290533 | A1 * | 11/2009 | Connors et al. | 370/316 |
| 2010/0332754 | A1 * | 12/2010 | Lai et al. | 711/118 |

OTHER PUBLICATIONS

Alamgir, "Effect of Congestion Control on the Performance of TCP and SCTP Over Satellite Networks", Jun. 11-Jun. 13, 2002, pp. 1-8, Publisher: NASA Earth Science Technology Conference.
Atiquzzaman, "Evaluation of SCTP Multistreaming Over Wireless/Satellite Links", 2003, pp. 591-594, Publisher: IEEE.
Budzisz, "Towards Transport-Layer Mobility: Evolution of SCTP Multihoming", "Computer Communications, Accessed Jun. 14, 2011, http://www.sciencedirect.com/science/article/pii/S014036640700549X", Mar. 25, 2008, pp. 1-3, vol. 31, No. 5, Publisher: Mobility Management and Wireless Access.
Burleigh, "Delay Tolerant Networking: An Approach to Communicating in Intermittently-Connected Environments", Apr. 24, 2003, pp. 1-16.
CERF, "RFC 4838—Delay-Tolerant Networking Architecture", 2007, pp. 1-30, Publisher: The IETF Trust.
Fall, "A Delay-Tolerant Network Architecture for Challenged Internets", "SIGCOMM'03", Aug. 25-Aug. 29, 2003, pp. 27-34, Publisher: ACM.

(Continued)

*Primary Examiner* — Ian N Moore
*Assistant Examiner* — Hien Nguyen
(74) *Attorney, Agent, or Firm* — Fogg & Powers LLC

(57) ABSTRACT

One exemplary embodiment is directed to a method for deep space communication. The method comprises generating a first packet, assigning a first priority level to the first packet, and selecting at least one communication link from a plurality of communication links for transmission of the first packet. Selecting is a function of a rule specifying which one or more communication links a packet of the first priority level is to be transmitted over. The method also includes transmitting the first packet over the at least one communication link.

14 Claims, 6 Drawing Sheets

(56) References Cited

OTHER PUBLICATIONS

Fang, "Performance of Multimedia Rate Control Protocols in Interplanetary Internet", "IEEE Communications Letters", Aug. 2004, pp. 1-3, Publisher: IEEE.

Tuxen, "SCTP for the Application Developer", Jun. 14, 2011, pp. 1-17.

Venkatesh, "Study of SCTP Congestion Control Over Deep Space Staellite Networks", "Space Communications and Navigation Symposium; Near-Earth and Interplanetary Communication Systems", 2009, p. 1, Publisher: 60th International Astronautical Congress 2009.

Venkatesh, "Evaluation of SCTP for Deep Space Networks", "Space Communications and Navigation Symposium; Near-Earth and Interplanetary Communications Systems", 2008, p. 1, Publisher: 59th International Astronautical Congress 2008.

Wood, "Saratoga: A Delay-Tolerant Networking Convergence Layer With Efficient Link Utilization", "Delay Tolerant Networking Session, Third International Workshop on Satellite and Space Communications", Sep. 2007, pp. 1-5.

Wood, "Using HTTP for Delivery in Delay/Disruption-Tolerant Networks", "Access Jun. 14, 2011 http://tools.ietf.org/pdf/draft-wood-dtnrg-http-dtn-delivery-07.pdf", May 12, 2011, pp. 1-12, Publisher: Network Working Group.

Zhang, "A Hierarchy Integrated Train Mobile Business Platform of China", "2010 Internation Conference on Electrical and Control Engineering, http://ieeexplore.ieee.org/xpl/freeabs_all.jsp?arnumber=5630083 accessed on Jun. 14, 2011", Jun. 25-Jun. 27, 2010, p. 1, Publisher: IEEE.

Fu et al., "Evaluation of SCTP for Space Networks", "Present and Future Satellite Communications", Oct. 2005, pp. 54-62, Publisher: IEEE.

* cited by examiner

MULTI-STREAMING MULTI-HOMING DELAY TOLERANT NETWORK PROTOCOL

BACKGROUND

Delay/Disruptive Tolerant Networks (DTNs) traditionally provide a store and forward approach to support the transmission of messages over networks with long delay and/or with periods of disruption or outage. These situations can be common in, for example, space communications and military theater communications. In addition, the volume of messaging required to be transmitted for future space missions, including video and multi-spectral and hyper spectral imagery, is likely to increase significantly (100× in less than 5 years). This increase in volume can require a spacecraft to have a significant amount of storage on-board to support the DTN operation. For example, the spacecraft may have to store a significant volume of data while there is no existing connectivity to transmit. Larger storage requirements lead to larger size, weight and power (SWaP) needs at the spacecraft.

SUMMARY

One exemplary embodiment is directed to a method for deep space communication. The method comprises generating a first packet, assigning a first priority level to the first packet, and selecting at least one communication link from a plurality of communication links for transmission of the first packet. Selecting is a function of a rule specifying which one or more communication links a packet of the first priority level is to be transmitted over. The method also includes transmitting the first packet over the at least one communication link.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
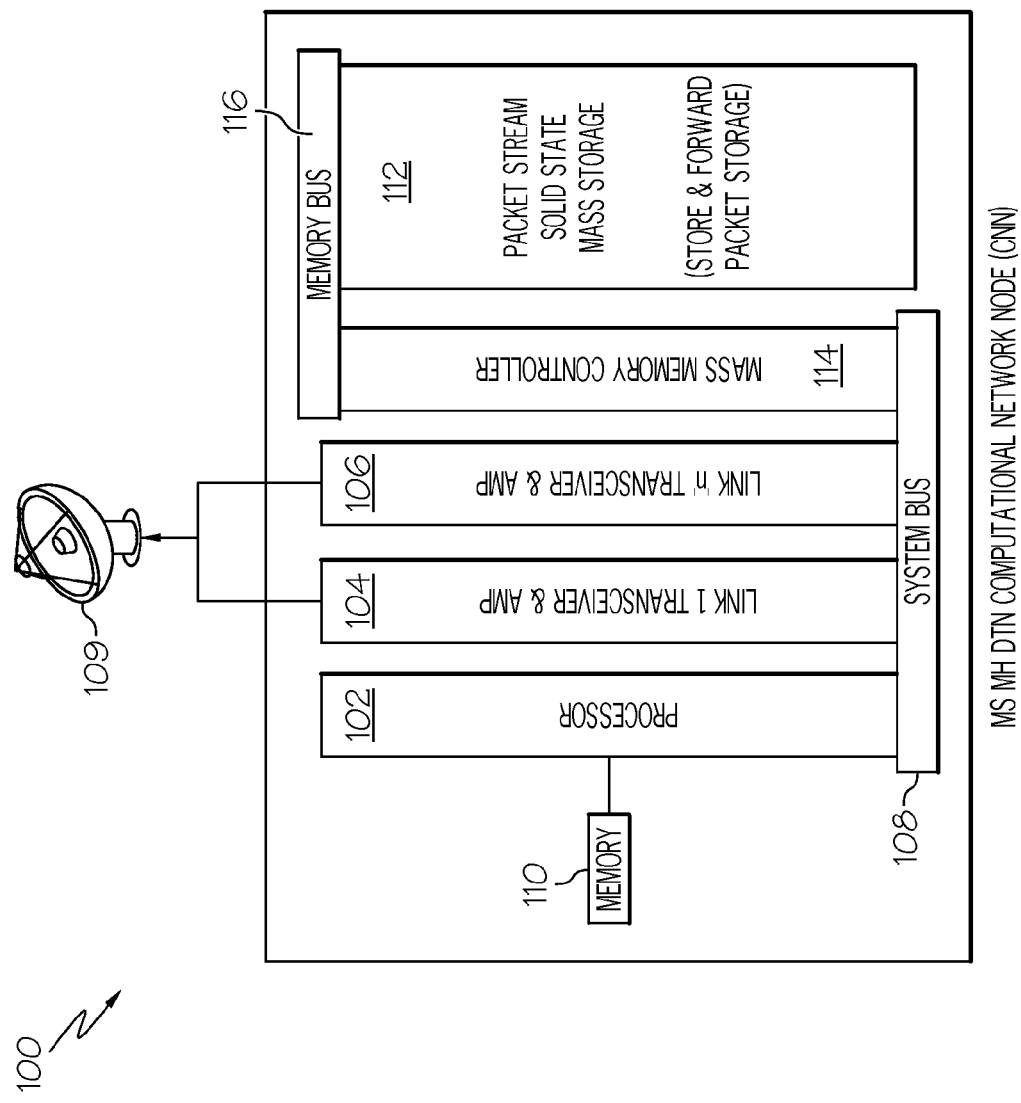
FIG. 1 is a block diagram of an example system for communicating according to a multi-streaming multi-homing delay/disruptive tolerant network (DTN) protocol.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of a system 100 for communicating according to a multi-streaming multi-homing delay/disruptive tolerant network (DTN) protocol (also referred to herein as the "R3 transport protocol" (R3TP)). In an example, R3TP can combine multi-streaming and multi-homing capability with a DTN capability. Multi-homing can refer to a means to maintain communication between the ground station and a spacecraft by using an association that can include multiple communication links. Data transmission over the association can be sent over any of the communication links subject to availability and any corresponding rules limiting use of particular communication link. The multi-homing capability in R3TP can be bidirectional such that both a ground station and a spacecraft can provide multi-homed end-points on the transmission association. R3TP can implement multi-streaming where multiple logical streams are used over a single association to increase throughput and help ensure higher priority messages are given priority over lower priority messages. R3TP can implement prioritized storage of packets when one or more communication links are not available. Prioritized storage can reduce the quantity of mass storage required and increase efficiency during transmission of stored packets when communication links become available. R3TP can increase transmission messaging efficiency and availability while still covering for loss of communication links, including loss of all communication links, for the system 100.

System 100 can include one or more processing devices 102 coupled to one or more transceivers 104, 106 by a system bus 108. The one or more transceivers 104, 106 can be coupled to one or more input/output devices 109 for sending a signal from the system 100 to another system and for receiving a signal from another at the system 100. The one or more processing devices 102 can be coupled to one or more memory devices 110 having instructions thereon for execution by the one or more processing devices 102. The instructions, when executed by the one or more processing devices 102, can cause the one or more processing devices 102 to perform certain actions. As used herein the one or more processing devices 102 are "configured" to perform an action when the one or more memory devices 110 includes instructions which, when executed by the one or more processing devices 102, cause the one or more processing devices to perform the action. The system 100 can also include one or more mass storage devices 112 to and from which the one or more processing devices 102 can store and retrieve data. The one or more mass storage devices 112 can be coupled to the one or more processing devices 102 though a mass storage controller 114. The mass storage controller 114 can control storage and retrieval of data from the one or more mass memory devices 112. In an example, the mass storage controller 114 can be coupled to the one or more processing devices 102 through the system bus 108 and can be coupled to the one or more mass storage devices 112 through a separate memory bus 116.

The one or more processing devices 102 can include a central processing unit (CPU), microcontroller, microprocessor, field programmable gate array (FPGA), etc. Instructions, when executed by the one or more processing devices 102, can cause the one or more processing devices 102 to implement methods according to a R3TP as described below. These instructions can be stored on any appropriate processor-readable medium used for storage of processor-readable instructions or data structures. As mentioned above, this processor-readable media can include the one or more memory devices 110. Suitable processor-readable media can include tangible media such as magnetic or optical media. For example, tangible media can include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media can also include transmission media such as electrical, electromagnetic, or digital signals, conveyed via a communication medium such as a network and/or a wireless link.

The following description refers to the one or more processing devices 102, the one or more memory devices 110, and the one or more mass storage devices 114 in the singular form (e.g., the processing device 102), however, it should be understood that the singular form is used for simplicity only, and that use of the singular form of these terms is not intended to limit them to a single component (e.g., a single processing device 102). Accordingly, although the singular form is used, it should be understood that one or more of the particular components can be used as indicated above.

As mentioned above, the one or more transceivers 104, 106 can be coupled to one or more input/output devices 109. The one or more input/output devices 109 can include an antenna and/or an optical transmitter/optical sensor. In an example, a first transceiver 104 can be a radio frequency (RF) transceiver that is coupled to an antenna and configured to transmit and receive radio frequency signals. In an example, the first transceiver can be a microwave transceiver that is coupled to an antenna and configured to transmit and receive microwave signals. In an example, the second transceiver 106 can be an optical transceiver that is coupled to an optical transmitter/optical sensor and configured to transmit and receive optical signals.

Figure 2:
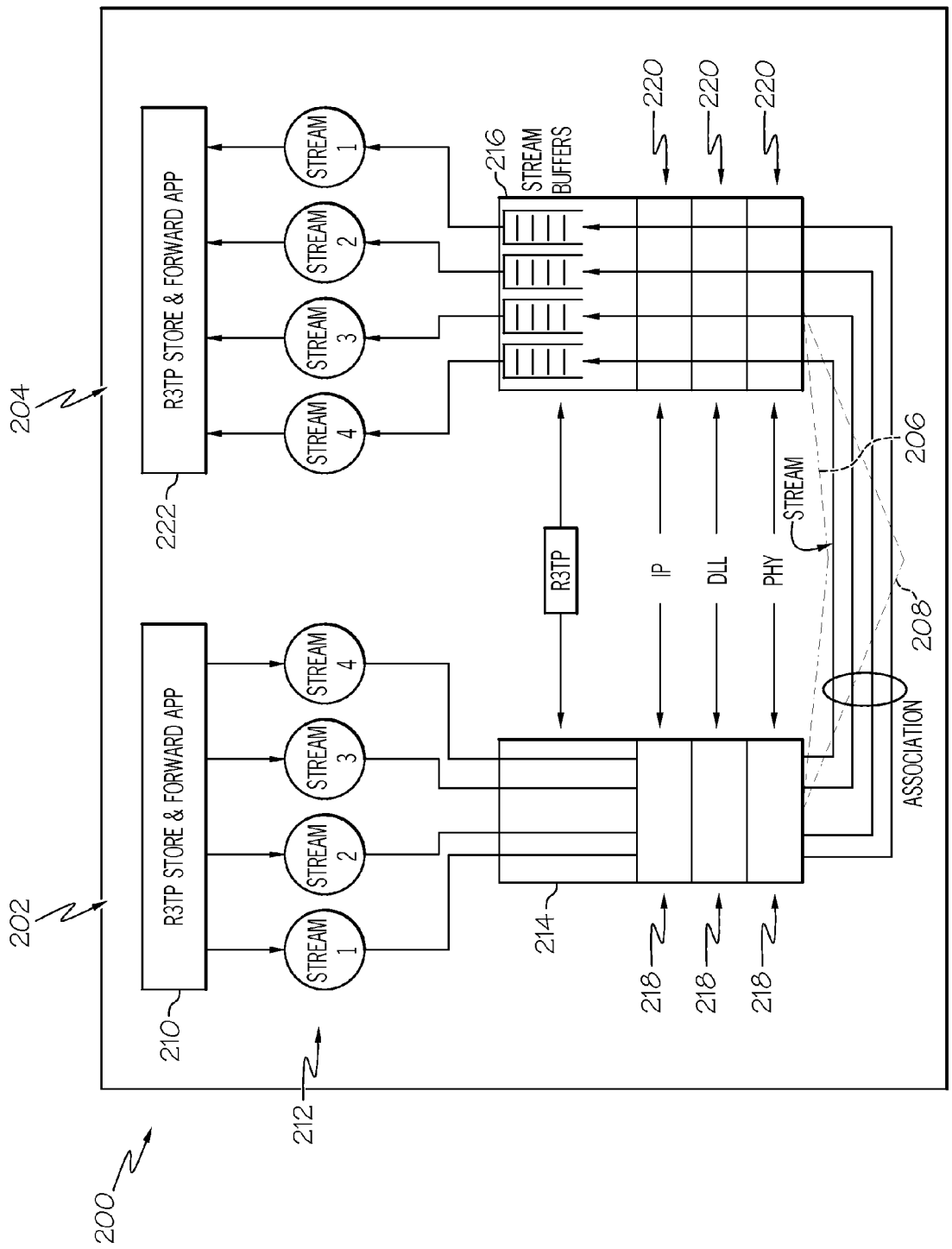
FIG. 2 is a diagram of an example method for communicating in accordance with R3TP.

FIG. 2 is a graphical example of a method 200 for communicating in accordance with R3TP. FIG. 2 illustrates a transmitting entity, shown generally at 202, transmitting packets to a receiving entity, shown generally at 204. Either or both of the transmitting entity 202 and the receiving entity 204 can comprise a system 100 as described with respect to FIG. 1. For explanation purposes, entity 202 is described as the transmitting entity and entity 204 is described as the receiving entity, however, it should be understood that the communication according to the R3TP can be bidirectional.

In an example, one or more communication links 206, 208 can be available to transmit packets from the transmitting entity 202 to the receiving entity 204. A communication link 206, 208 can include a connection established between the physical layer 210 of the transmitting entity 202 and the physical layer 212 of the receiving entity 204 over a physical medium that enables transmission of data between transmitting entity 202 and the receiving entity 204. In an example, multiple communication links 206, 208 can be available between the transmitting entity 202 and the receiving entity 204. In some examples, these multiple links 206, 208 can include links of different types. For example, a first communication link 206 can be an RF link and a second communication 208 can be an optical link. In some examples, a microwave link can be used instead of or in addition to one of these links. As used herein, an optical link includes the frequencies corresponding to infrared signals. In an example, a system (e.g., system 100) can support one optical link, two RF links, and a microwave link available between the transmitting entity 202 and the receiving entity 204.

Method 200 begins with data generated by or otherwise obtained by an application process (e.g., a user application) at the transmitting entity 204. The application process can provide the data to the R3TP stack for transmission to an application process at the receiving entity 204. R3TP at the transmitting entity 202 can generate one or more packets from the data for transmission to the receiving entity 204. The store and forward layer 210 can then determine whether to store a particular packet in the mass storage device 112 or transmit (e.g., forward) the packet to the receiving entity 204. In an example, the store and forward layer 210 can determine whether to store or forward the packet based on the availability of communication links 206, 208 between the transmitting entity 202 and the receiving entity 204. For example, if no communication links 206, 208 are available to the receiving entity then the store and forward layer 210 can determine that the packets should be either stored or discarded. More detail on storing or discarding the packets is provided below.

When the store and forward layer 210 determines that the packets are to be transmitted (as opposed to stored), the store and forward layer 210 can assign the packets a priority level. In an example, the priority level for a packet can be determined, at least in part, based on a type of data that the packet contains. For example, packets containing command and control (C2) data can have a higher priority than packets containing telemetry data. In an example, the transmitting entity 202 can include a spacecraft and command and control data can be data used for controlling operation of the spacecraft. In an example, command and control data can include commands sent to the spacecraft that cause the spacecraft to take an action based thereon or information (e.g., feedback related) sent from the spacecraft to a controlling entity to be used to determine how to control the spacecraft. Telemetry data, on the other hand, can include data relating to experimental information obtained by the spacecraft. In some examples, priority can be based on specific type of command and control data and/or telemetry data. For example, packets containing data relating to command and control of the navigation of the spacecraft as a whole can be assigned a higher priority than command and control data relating to movement of a robotic arm to conduct an experiment. In another example, telemetry data relating to a video can be assigned a higher priority than telemetry data relating to light readings. As should be understood, priority levels for a given type of packet can be set in most any manner based on the particular application. Also, in some examples, priority assignments (e.g., which types of packets are assigned which priority) can be modified. Thus, at a first time telemetry data relating to videos can be assigned a higher priority than telemetry data related to light readings, while at a second time telemetry data relating to light readings can be given a higher priority than telemetry data relating to videos.

The store and forward layer 210 can also assign a stream to the packets. A stream 212 is a logical path between a transmitting entity 202 and the receiving entity 204. Multiple streams are provided to enable different streams to be treated differently. In an example, the process of assigning a priority is the same process as assigning a stream. That is, the store and forward layer 210 can assign a stream to the packets based on a type or priority level for the packet without separately assigning a priority level. The priority level and the stream assignment are one single assignment.

Figure 3:
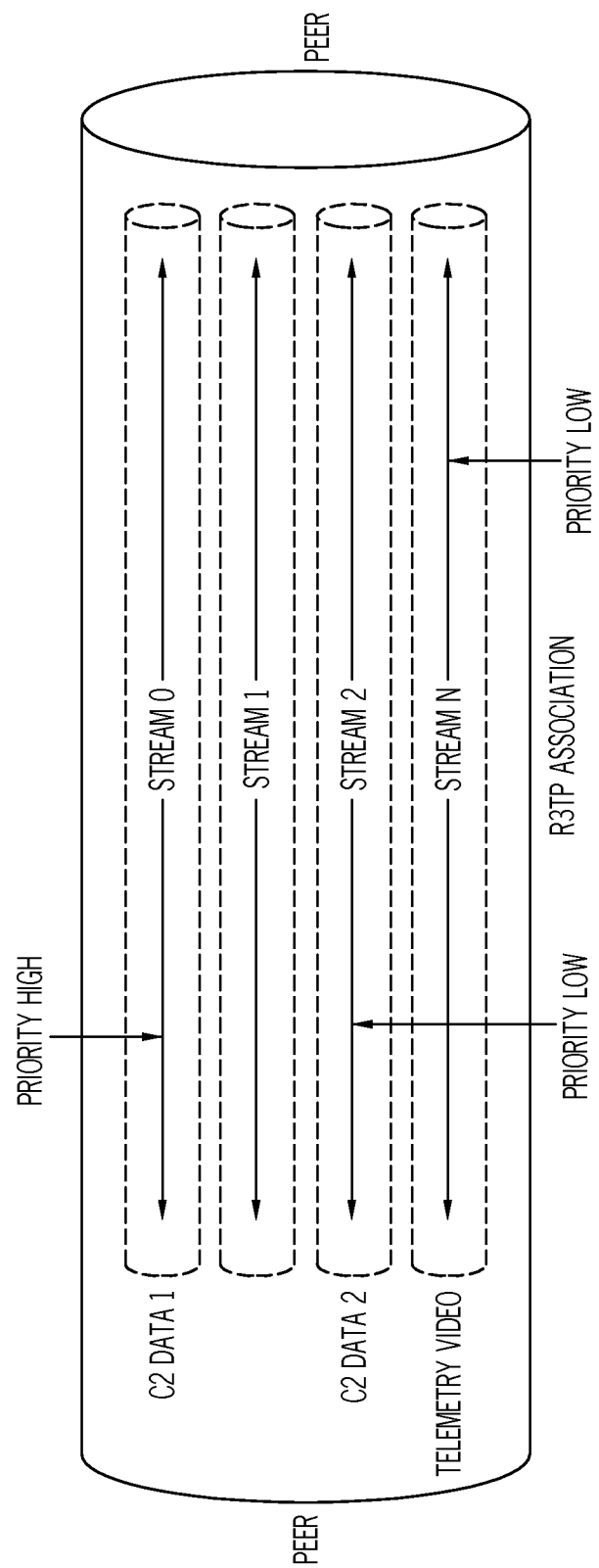
FIG. 3 is a diagram of an example of four streams between a transmitting entity and a receiving entity.

FIG. 3 is a graphical illustration of an example of four streams between the transmitting entity 202 and the receiving entity 204. In an example, the packets can be associated with a stream based on a priority level and/or a type for the packet. For example, streams 1 and 2 can include packets of a highest priority, stream 3 can include packets of a middle priority, and streams 3 and 4 can include packets of a lowest priority.

Use of multiple streams for different priority packets can help reduce the ability of a lower priority packet to block a higher priority packet (e.g., referred to as head of line blocking). Also, use of multiple streams can enable streams of higher priority to be granted larger percentage of the bandwidth and/or to be granted and/or given dedicated (e.g., sole) access to a particular communication link or bandwidth.

Once the store and forward layer 210 has assigned a stream to a packet, the packet can be provided to the R3TP layer 214. The R3TP layer 214 on the transmitting entity 202 can form an association with the R3TP layer 216 on the receiving entity 204. An association can hide the multi-homing operation (e.g., the multiple communication links available) from the store and forward layer 210 and other application processes (e.g., link user software). Thus, an application process can see the association without seeing the specific communication links and the R3TP layer can make the determination as to which communication link to use for a particular packet. The R3TP layer 214 can determine which communication link 206, 208 to be used for transmission based on a priority level for the packet, message, or stream. In an example, the R3TP layer 214 can select the communication link 206, 208 based on a rule indicating which priority level and/or type of packets are to be sent over which communication link. For example, a rule can indicate that a higher priority of data (e.g., command and control data) is to be sent over an optical link and a lower priority of data (e.g., telemetry data) is to be sent over an RF link.

In another example, a rule can indicate that a first type or priority of data is to be assigned dedicated access to a first communication link 206 (e.g., an optical link) and secondary access (when the first communication link 206 is down) to a second communication link 208 (e.g., an RF link). This rule can assign all other data to the second communication link 208, without access to the first communication link 206. Thus, the first priority and/or type of data (e.g., command and control data) can be allowed to be sent on either the first or the second communication link 206, 208, thereby increasing the likelihood that this first priority and/or type of data can be transmitted in a timely manner. All other data, however, is restricted to the second communication link 208 to help ensure that the first priority and/or type of data has sufficient bandwidth (e.g., by virtue of the dedicated first communication link 206). As should be understood, these rules are merely examples, and other rules can be provided to accomplish the goals of the particular application. Moreover, a rule can be modified over time to account for changing goals.

From the R3TP layer 214, the packets can be provided to lower layers 218 to be formatted for transmission over their respective communication link 206, 208. In an example, these lower layers can include an internet protocol (IP) layer, a data link layer (DLL), and a physical layer (PHY).

As mentioned above, in some situations, one or more communication links 206, 208 may not be available. A communication link may not be available (e.g., non-operational) due to, for example, weather disturbances between the transmitting entity 202 and the receiving entity 204, no line of sight (LOS) contact between the transmitting entity 202 and the receiving entity 204, or other reasons. In addition to availability, a rule (as discussed above) can limit over which communication links a packet may be sent. Accordingly, the transmitting entity 202, based on the R3TP protocol, can determine actions to take with respect to a packet based on which communication links 206, 208 are available and based on the rule(s) applicable to the packet.

When all communication links 206, 208 over which a packet can be sent are unavailable, the transmitting entity 202 cannot transmit the packet and instead determines whether to store or discard the packet. As an example, all communication links 206, 208 for a packet can be unavailable when all communication links 206, 208 for an association from the R3TP layer 214 to the R3TP layer 216 are unavailable. All communication links for a packet can also be unavailable when one or more communication links for an association are available, but a rule restricts transmission of the packet to one or more other communication links which are not available.

Once the transmitting entity 202 has identified that all communication links 206, 208 for a packet are unavailable, the transmitting entity 202 can determine whether to store or discard the packet. A stored packet can be stored in the mass storage device 112. A discarded packet is not stored and, if desired at a later time, may have to be re-generated.

In an example, the transmitting entity 202 can determine whether to store or discard the packet based on a priority level and/or a stream assignment for the packet. The transmitting entity 202 can also determine whether to store or discard the packet based on a quantity of available storage space (e.g., storage space not containing currently valid data) in the mass storage device 112. In an example, when the quantity of available storage space in the mass storage device 112 drops to a threshold, the transmitting entity 202 can initiate discarding of packets. Before the threshold is reached, the transmitting entity 202 can store all packets.

As an example, packets having a priority above a threshold priority can be stored, and packets below the threshold priority are discarded. In some examples, multiple thresholds can be used, such that as the mass storage device 112 gets closer to full, the threshold priority for storing the packets rises. Thus, as the mass storage device 112 fills, the number of packets stored may be reduced and the remaining space is increasingly allocated to the highest priority packets to help ensure these high priority packets are stored.

Additionally, at a given quantity threshold for the mass storage device 112, packets previously stored in the mass storage device 112 can be deleted to free up space for higher priority and/or newer packets. For example, when the storage device 112 reaches a threshold quantity of available storage space, packets below a threshold priority level can be deleted. In some examples, deleting of the packets can be controlled to a given ration with respect to the storing of new packets such that for example, for every 2 packets stored 1 packet is deleted. In an example, packets of the lowest priority in the mass storage device 112 are deleted first. Similar to that described above, there can be multiple (e.g., stepped) quantity thresholds for deleting previously stored packets such that as the mass storage device 112 fills, the priority level at which packets are deleted increases. Additionally, any of the thresholds can be adjusted over time.

In an example, packets can be stored to maintain their priority and/or stream assignment. Accordingly, when one or more communication links 206, 208 becomes available for a stored packet, the order in which packets are transmitted can be based on the priority level and/or stream assignment of the packet. For example, when a communication link 206, 208 becomes available after a period in which no communication links 206, 208 have been available, the R3TP layer 214 can transmit packets all assigned to stream 1 before packets assigned to other streams are transmitted. Once all the packets of stream 1 are transmitted, packets assigned to other streams can be transmitted. Streams can also be allocated a certain percentage of the bandwidth. Thus, for example, after all the packets of stream 1 are transmitted, packets of stream 2 can be ⅓ of the bandwidth, with another ⅓ allocated between streams 3 and 4. The final third can be allocated to currently generated (e.g., not stored) data. In some examples, however, the chronological order of generation of data can be generally maintained, such that currently generated data is stored in the mass storage device 112 even if a communication link 206, 208 is available. This current generated data can be stored until previously generated data having a chronological relationship to the currently generated data that is stored in the mass storage device 112 has been transmitted. Then, the data can be transmitted in chronological order. Again, different streams can have different rules such that stream 1 can have all data transmitted in chronological order of generation of data, while stream 2 can have no such requirement. As should be understood, the above schemes and rules are merely examples and other allocation schemes and rules can be used.

In an example, the packets can be stored in the mass storage device 112 with protocol headers attached and such that they can be retrieved without. Thus, stored packets can be transmitted with ease, for example, with minimal initial packet processing.

Referring now to the receiving entity 204, packets sent by the transmitting entity 202 can be received by receiving entity 204 and processed up the protocol stack in an opposite manner as described with respect to the transmitting entity 202. Accordingly, packets received on either communication link 206, 208 can be processed by the lower layers 220 of the receiving entity 204. From the lower layers 220 of the receiving entity, the received packets can be provided to the R3TP layer 216. The R3TP layer 216 can buffer each of the streams individually to order and ensure reception of all the packets before they are provided to the store and forward layer 222.

Figure 4:
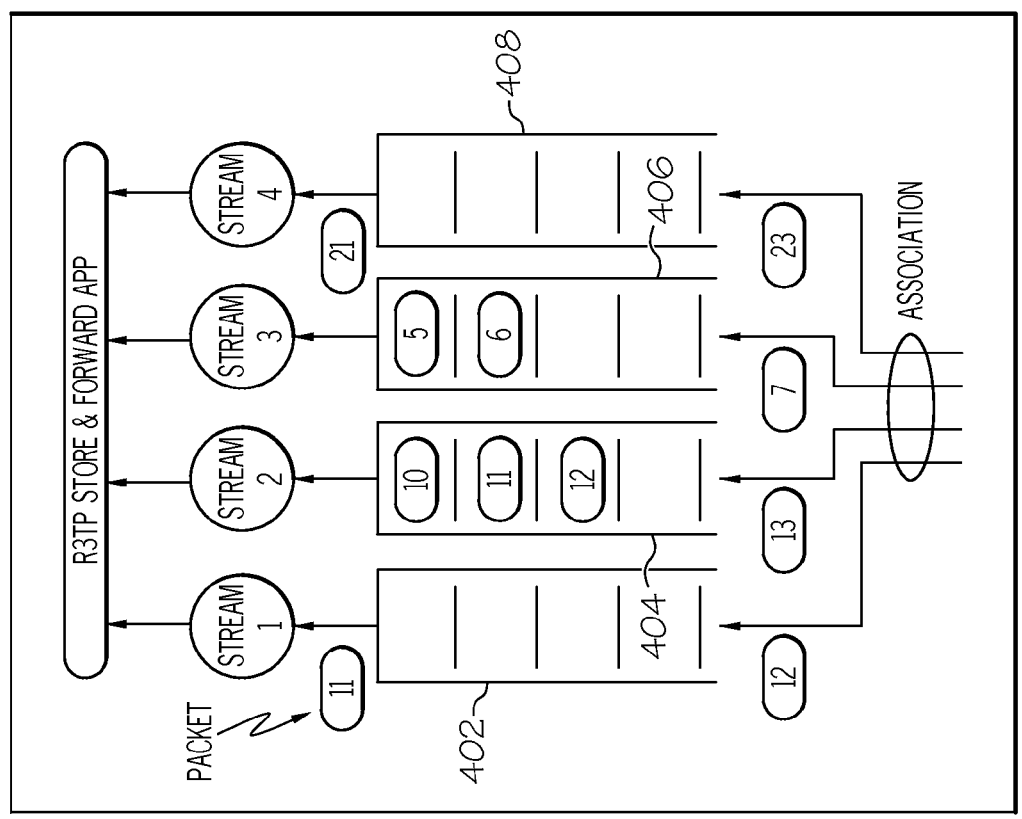
FIG. 4 is a diagram of an example of buffering in the R3TP layer of a receiving entity.

FIG. 4 is a graphical example of buffering in the R3TP layer 210 of the receiving entity 204. In an example, each stream has an individual buffer. Accordingly, a first buffer 402 accepts packets from stream 1, a second buffer 404 from stream 2, a third buffer 406 from stream 3, and a fourth buffer 408 from stream 4. Individual buffers can help reduce head of line blocking. In an example, the transmitting entity 202 can include a stream sequence number with packets that are sent. The stream sequence number (SSN) can be unique to the stream in which the packet is sent (e.g., packets in different streams can have the same stream sequence number).

In an example, the R3TP layer 216 provides the packets to the store and forward layer 222 in sequence with respect to the stream that are assigned. Accordingly, SSN 1 for stream 1 is provided to the store and forward layer 216. SSN 2 for stream 1 is provided to the store and forward layer 222 after SSN 1. Packets may be received out of order by the receiving entity 204 due to, for example, packets with errors that need to be re-sent. When a chronologically later packet in the sequence (e.g., SSN 2 for stream 1) is received before a valid version of a chronologically earlier packet (e.g., SSN 1 for stream 1), the later packet is held in the buffer (buffer 402 in this example) corresponding to the stream of the packet until a valid copy of the chronologically earlier packet is received from the transmitting device 202. Accordingly, stream 1 is held until the chronologically earlier packet in the sequence is received. Since each stream has an individual buffer, however, streams other than stream 1 are not held based on the delay of SSN 1 of stream 1. Thus, the delay of SSN 1 of stream 1 does not block reception of the other streams.

As shown in FIG. 4, when packets are received at the R3TP layer 216 the packets are placed into a buffer 402, 404, 406, 408 corresponding to their stream. FIG. 4 illustrates that SSN 11 of stream 1 has been delivered to the store and forward layer 222. SSN 9 of stream 2 has been lost and SSNs 10, 11, and 12 of stream 2 are therefore queued (held) waiting for SSN 9 to arrive. Arriving packet 13 of stream 2 will also be queued in the buffer 404. Similarly, SSN 4 of stream 3 is lost during transmission resulting in blocking of SSNs 5, 6, and 7 of stream 3. For stream 4, SSN 21 is being delivered to the store and forward layer 222 while arriving SSN 23 will be queued in buffer 408 because of missing SSN 22 of stream 4. Note that when SSN 12 of stream 1 arrives at buffer 402, SSN 12 can be delivered immediately even if other streams are blocked.

In an example, the receiving entity 204 can send selective acknowledgements for packets received from the transmitting entity 202. In an example, R3TP can use a large transmission window with the selective acknowledgement which enables a deep space link with a long propagation delay to be filled with reduced waiting due to stopping by the receiving entity 204. In an example, to implement the selective acknowledgements, the receiving entity 204 can send a negative acknowledgement to the transmitting entity 202 when packet is lost. In this example, while valid packets are being received, no acknowledgements are sent. In an example, the receiving entity 204 can identify when a packet is lost based on missing packets in the sequence (according to the sequence numbers) for the stream. When the receiving entity 204 identifies one or more missing packets, the receiving entity 204 can transmit a negative acknowledgement (NACK) to the transmitting entity 202. The NACK can specifically identify the missing packets such that the transmitting entity 202 can then transmit the precise one or more packets that are missing, without transmitting packets that have been validly received. In an example, the selective acknowledgement is performed on a stream basis and is reported between the R3TP layer 216 of the receiving entity 204 and the R3TP layer 214 of the transmitting entity 202.

In an example, the receiving entity 204 can send a command to the transmitting entity 202 to instruct the transmitting entity 202 to hold transmission until an acknowledgment corresponding to a missing packet has been received from the receiving entity 204. This command can be used to address situations when the buffers at the receiving entity 204 fill up. Since the receiving entity 204 holds chronologically later packets of a stream sequence having a missing packet in a buffer, and since there is a long propagation delay for deep space signals, the buffer in the receiving entity 204 may begin to fill up before a missing packet can be validly received. Accordingly, the receiving entity 204 can send a command to hold transmission of packets other than those that are missing. When the missing packets are received validly, the receiving entity 204 can transmit an acknowledgement (ACK) which indicates to the transmitting entity 202 that it can resume transmission of all packets again.

Figure 5:
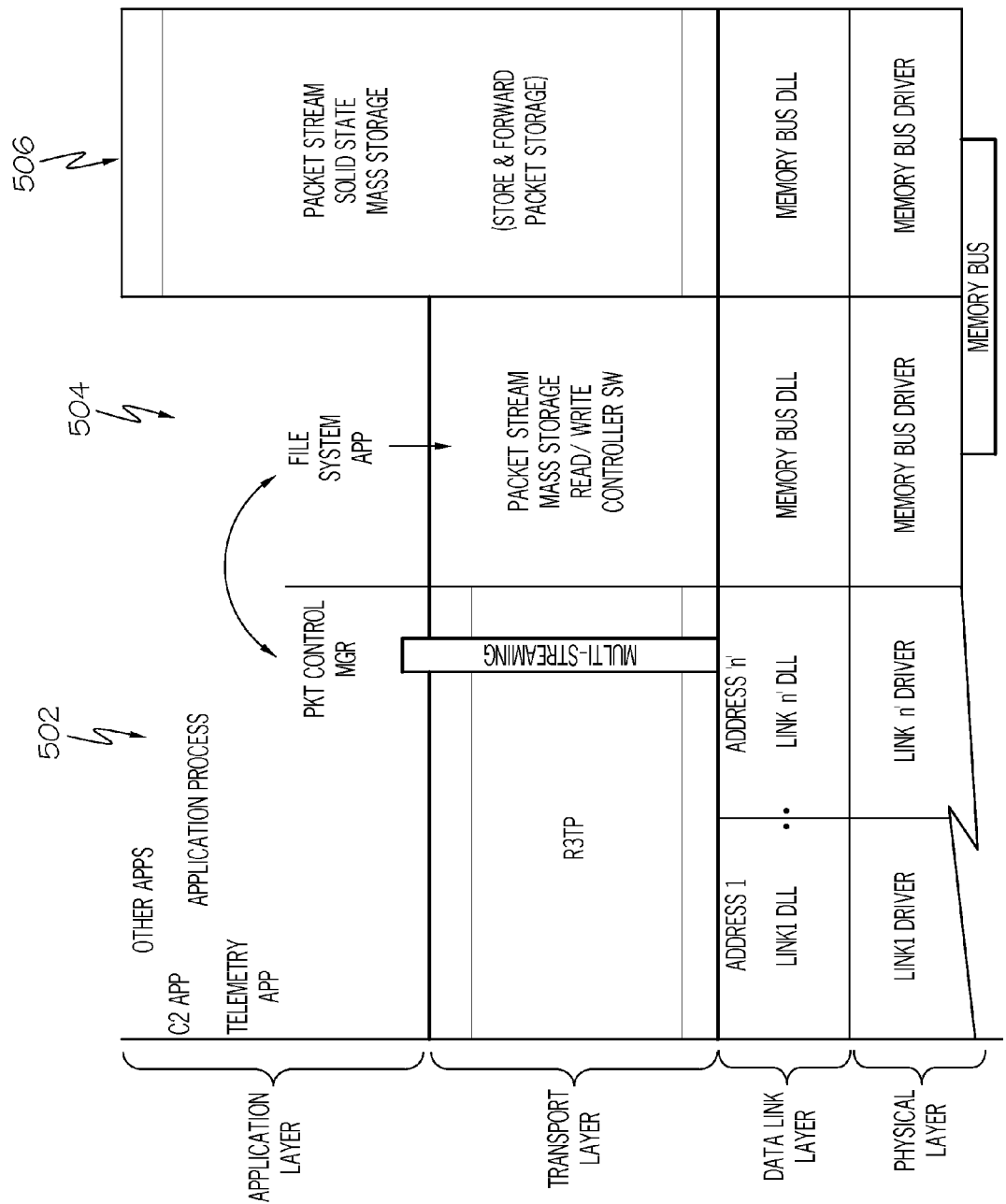
FIG. 5 is a diagram of an example architecture for the R3TP protocol.

FIG. 5 is a diagram of an example architecture for the R3TP protocol. FIG. 5 illustrates three columns: the left column 502 corresponds to the protocol stack for transmitting packets to and receiving packets from another entity with which an association has been made; the middle column 504 corresponds to the protocol stack for sending packets to and receiving packets from the mass storage device 112 for storage; and the right column 506 corresponds to the protocol stack for storing packets in and retrieving packets from the mass storage device 112.

The physical layers for the protocol stacks include drivers for transmitting and receiving on respective communication links 206, 208 in the left column 502, and memory bus drivers for sending and receiving packets over the memory bus for the middle and right columns 504, 506. The data link layers include a DLL for each communication link 206, 208 in the left column 502, and a memory bus DLL for the middle and right columns 504, 506. The transport layers include the R3TP layer for the left column 502 and a packet stream mass storage read/write controller for the middle column 504. The transport layer and the application layer for the right column 506 are encompassed by the mass storage device 112. The application layer for the left column can include user applications such as a command and control (C2) application, a telemetry application, a store and forward application and others. The left column 502 can also include a packet control manager that controls the distribution and assignment of packets between multiple streams as described above. The application layer for the middle column 504 can include a file system application to control the file storage and retrieval.

Figure 6:
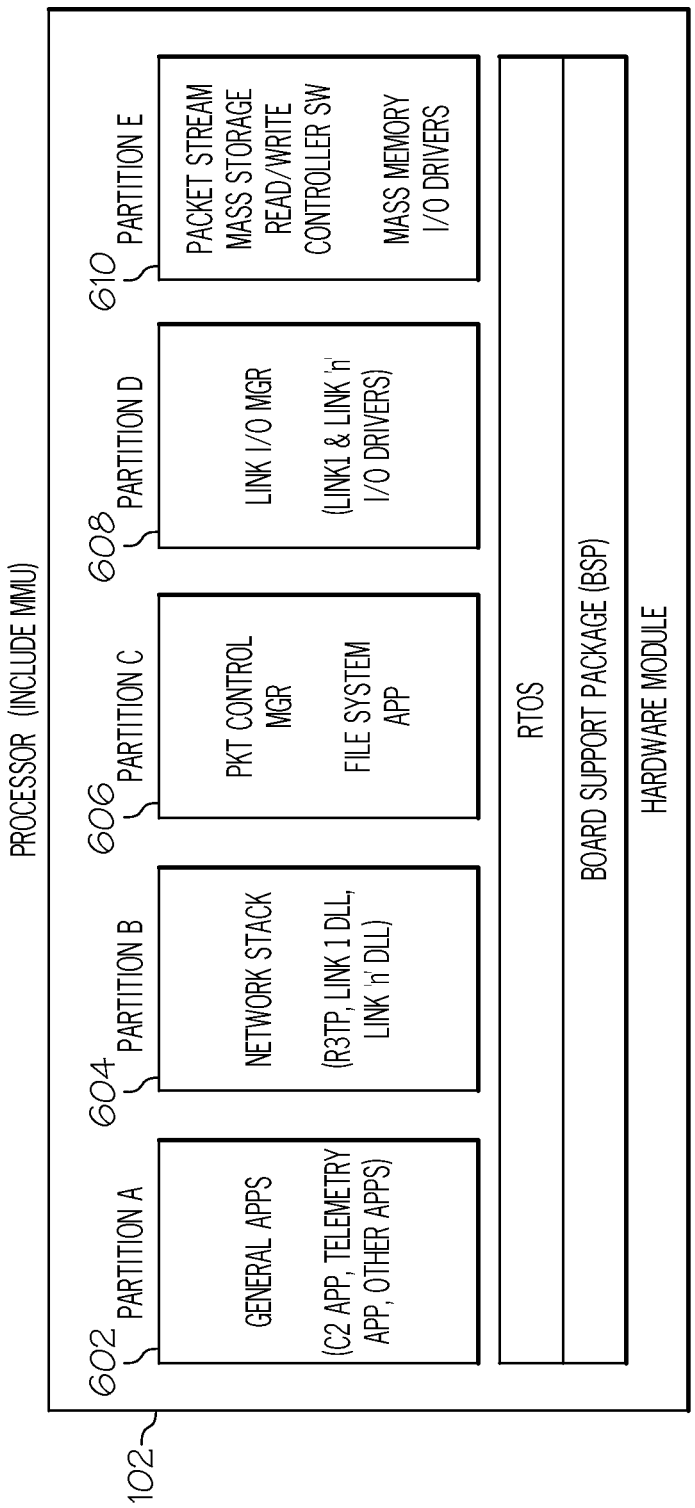
FIG. 6 is a diagram of an example time and space partitioning for a processing device implementing the R3TP protocol.

FIG. 6 is a diagram of an example time and space partitioning for a processing device 102 implementing the R3TP protocol. In this example, the processing device 102 includes a memory management unit. The processing device 102 can implement a board support package (BSP) and a real-time operating system (RTOS). In this example, the processing device 102 can also implement five software partitions. A first partition 602 can execute general applications such as a C2 application, telemetry application, and other applications. A second partition 604 can execute the network stack for transmission of packets to and receiving packets from another entity. A third partition 606 can implement the package control manager and the file system application. A fourth partition 608 can implement the link input/output manager, and a fifth partition 610 can implement a read/write controller for storage of packets in the mass storage device 112 as well as the input/output drivers for the mass storage device 112.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a method for deep space communication, the method comprising generating a first packet; assigning a first priority level to the first packet; selecting at least one communication link from a plurality of communication links for transmission of the first packet, wherein selecting is a function of a rule specifying which one or more communication links a packet of the first priority level is to be transmitted over; and transmitting the first packet over the at least one communication link.

Example 2 includes an apparatus for deep space communication, the apparatus comprising: one or more processing device; a first transceiver coupled to the one or more processing device and configured to transmit and receive signals over a first communication link; a second transceiver coupled to the one or more processing device and configured to transmit and receive signals over a second communication link; one or more mass storage device coupled to the one or more processing device; and one or more memory device coupled to the one or more processing device, wherein the one or more memory device includes instructions which, when executed by the one or more processing device, cause the one or more processing device to: generate a first packet; assign a first priority level to the first packet; assign the first packet to a first stream of a plurality of streams based on a rule specifying that packets of the first priority level are to be assigned to the first stream; select at least one communication link from a plurality of communication links for transmission of the first packet, wherein select is a function of a rule specifying which one or more communication links a packet of stream is to be transmitted over; and transmit the first packet over the at least one communication link.

Example 3 includes a processor-readable medium including instructions which, when executed by a processing device, cause the processing device to: generate a first packet of a first type; assign the first packet to a first stream of a plurality of streams based on a rule specifying that packets of the first type are to be assigned to the first stream; select at least one communication link from a plurality of communication links for transmission of the first packet, wherein select is a function of a rule specifying which one or more communication links a packet of stream is to be transmitted over; and transmit the first packet over the at least one communication link In Example 4, the subject matter of any of Examples 1-3 can optionally include assigning the first packet to a first stream of a plurality of streams based on a rule specifying that packets of the first priority level are to be assigned to the first stream.

In Example 5, the subject matter of Example 3 can optionally include wherein the rule specifying which one or more communication links a packet of the first priority level is to be transmitted over, specifies that packets from the first stream are to be transmitted over the at least one communication link.

In Example 6, the subject matter of any of Examples 1-5 can optionally include generating a plurality of packets; assigning each of the plurality of packets to a stream of the plurality of streams; if all communication links for transmission of one or more packets of the plurality of packets are unavailable, determining whether to store or discard the one or more packets; storing a first at least one packet in a mass storage device, wherein the first at least one packet is stored with an indication of the stream assigned thereto; discarding a second at least one packet; and retrieving the first at least one packets from the mass storage device and transmitting the first at least one packets if a communication link for transmission of the first at least one packet becomes available.

In Example 7, the subject matter of Example 6 can optionally include wherein determining whether to store or discard the one or more packets includes determining as a function of a stream to which the packet is assigned.

In Example 8, the subject matter of Example 7 can optionally include wherein determining whether to store or discard the one or more packets includes determining as a function of a quantity of storage space available in the mass storage device.

In Example 9, the subject matter of any of Examples 6-8 can optionally include wherein transmitting the first at least one packets from the mass storage device includes transmitting the first at least one packets as a function of the stream to which the packet is assigned.

In Example 10, the subject matter of any of Examples 1-9 can optionally include generating a second packet; assigning a second priority level to the second packet; and transmitting the second packet over any of the communication links as a function of rule that allows transmission of packets having the second priority level on any of the communication links.

In Example 11, the subject matter of Example 10 can optionally include wherein the rule that allows transmission of packets having the second priority level on any of the communication links, specifies that a first communication link is to be used for transmission of packets instead of other communication links when the first communication link is available.

In Example 12, the subject matter of any of Examples 1-11 can optionally include wherein the plurality of communication links includes at least two of an optical link, a radio frequency link, and a microwave link.

In Example 13, the subject matter of any of Examples 1-12 can optionally include wherein assigning a first priority level includes assigning a first priority level as a function of a type of data to which the first packet corresponds, wherein types of data include command and control data and telemetry data.

What is claimed is:

1. A method for deep space communication, the method comprising:
    generating a first packet;
    assigning a first priority level to the first packet;
    selecting at least one communication link from a plurality of communication links for transmission of the first packet, wherein selecting is a function of a rule specifying which one or more communication links a packet of the first priority level is to be transmitted over;
    transmitting the first packet over the at least one communication link;
    generating a plurality of packets;
    assigning each of the plurality of packets to a stream of the plurality of streams;
    if all communication links for transmission of one or more packets of the plurality of packets are unavailable, determining whether to store or discard the one or more packets, wherein determining whether to store or discard the one or more packets includes determining as a function of a stream to which the packet is assigned, wherein determining whether to store or discard the one or more packets includes determining as a function of a quantity of storage space available in the mass storage device;
    storing a first at least one packet in a mass storage device, wherein the first at least one packet is stored with an indication of the stream assigned thereto;
    discarding a second at least one packet; and
    retrieving the first at least one packets from the mass storage device and transmitting the first at least one packets if a communication link for transmission of the first at least one packet becomes available.

2. The method of claim 1, comprising:
    assigning the first packet to a first stream of a plurality of streams based on a rule specifying that packets of the first priority level are to be assigned to the first stream.

3. The method of claim 2, wherein the rule specifying which one or more communication links a packet of the first priority level is to be transmitted over, specifies that packets from the first stream are to be transmitted over the at least one communication link.

4. The method of claim 1, wherein transmitting the first at least one packets from the mass storage device includes transmitting the first at least one packets as a function of the stream to which the packet is assigned.

5. The method of claim 1, comprising:
    generating a second packet;
    assigning a second priority level to the second packet; and
    transmitting the second packet over any of the communication links as a function of rule that allows transmission of packets having the second priority level on any of the communication links.

6. The method of claim 5, wherein the rule that allows transmission of packets having the second priority level on any of the communication links, specifies that a first communication link is to be used for transmission of packets instead of other communication links when the first communication link is available.

7. The method of claim 1, wherein the plurality of communication links includes at least two of an optical link, a radio frequency link, and a microwave link.

8. The method of claim 1, wherein assigning a first priority level includes assigning a first priority level as a function of a type of data to which the first packet corresponds, wherein types of data include command and control data and telemetry data.

9. An apparatus for deep space communication, the apparatus comprising:
    one or more processing devices;
    a first transceiver coupled to the one or more processing devices and configured to transmit and receive signals over a first communication link;
    a second transceiver coupled to the one or more processing device and configured to transmit and receive signals over a second communication link;
    one or more mass storage devices coupled to the one or more processing devices; and
    one or more memory devices coupled to the one or more processing devices, wherein the one or more memory devices includes instructions which, when executed by the one or more processing devices, cause the one or more processing devices to:
    generate a first packet;
    assign a first priority level to the first packet;
    assign the first packet to a first stream of a plurality of streams based on a rule specifying that packets of the first priority level are to be assigned to the first stream;
    select at least one communication link from a plurality of communication links for transmission of the first packet, wherein select is a function of a rule specifying which one or more communication links a packet of stream is to be transmitted over; and
    transmit the first packet over the at least one communication link;
    generate a plurality of packets;
    assign each of the plurality of packets to a stream of the plurality of streams;
    if all communication links for transmission of one or more packets of the plurality of packets are unavailable, determine whether to store or discard the one or more packets, wherein determine whether to store or discard the one or more packets includes determine as a function of a stream to which the packet is assigned, wherein determine whether to store or discard the one or more packets includes determine as a function of a quantity of storage space available in the mass storage device;
    store a first at least one packet in a mass storage device, wherein the first at least one packet is stored with an indication of the stream assigned thereto;
    discard a second at least one packet; and
    retrieve the first at least one packets from the mass storage device and transmit the first at least one packets if a communication link for transmission of the first at least one packet becomes available.

10. The apparatus of claim 9, wherein transmit the first at least one packets from the mass storage device includes transmit the first at least one packets as a function of the stream to which the packet is assigned.

11. The apparatus of claim 9, wherein the instructions, when executed by the one or more processing devices, cause the one or more processing devices to:

generate a second packet;

assign a second priority level to the second packet; and transmit the second packet over any of the communication links as a function of rule that allows transmission of packets having the second priority level on any of the communication links, wherein the rule that allows transmission of packets having the second priority level on any of the communication links, specifies that a first communication link is to be used for transmission of packets instead of other communication links when the first communication link is available.

12. The apparatus of claim 9, wherein the first transceiver is configured to transmit and receiver over an optical communication link and the second transceiver is configured to transmit and receive over one of a radio frequency communication link and a microwave communication link.

13. The apparatus of claim 9, wherein assign a first priority level includes assign a first priority level as a function of a type of data to which the first packet corresponds, wherein types of data include command and control data and telemetry data.

14. A non-transitory a processor-readable medium including instructions which, when executed by a processing device, cause the processing device to:

generate a first packet of a first type;

assign the first packet to a first stream of a plurality of streams based on a rule specifying that packets of the first type are to be assigned to the first stream;

select at least one communication link from a plurality of communication links for transmission of the first packet, wherein select is a function of a rule specifying which one or more communication links a packet of stream is to be transmitted over; and transmit the first packet over the at least one communication link;

generate a plurality of packets;

assign each of the plurality of packets to a stream of the plurality of streams;

if all communication links for transmission of one or more packets of the plurality of packets are unavailable, determine whether to store or discard the one or more packets, wherein determine whether to store or discard the one or more packets includes determine as a function of a stream to which the packet is assigned, wherein determine whether to store or discard the one or more packets includes determine as a function of a quantity of storage space available in the mass storage device;

store a first at least one packet in a mass storage device, wherein the first at least one packet is stored with an indication of the stream assigned thereto;

discard a second at least one packet; and retrieve the first at least one packets from the mass storage device and transmit the first at least one packets if a communication link for transmission of the first at least one packet becomes available.

* * * * *